United States Patent Office 3,285,908
Patented Nov. 15, 1966

3,285,908
INDOLYL ACID AMIDES
Tsung-Ying Shen, Westfield, N.J., assignor to Merck & Co., Inc., Rahway, N.J., a corporation of New Jersey
No Drawing. Filed Apr. 30, 1963, Ser. No. 276,986
9 Claims. (Cl. 260—211)

This application is a continuation-in-part of my co-pending application Serial No. 164,615, filed January 5, 1963, which was a continuation-in-part of Serial No. 97,-434, filed March 22, 1961, both now abandoned.

This invention relates to new chemical compounds. More particularly, it relates to a new class of compounds of the indole series. Still more particularly, it is concerned with secondary and tertiary amides of $\alpha$-(3-indolyl)-lower aliphatic acids having an aromatic carboxylic acyl (i.e., an aroyl or hetero-aroyl) radical of less than three fused rings attached to the nitrogen atom of the indole ring. It is concerned further with the relief of pain and inflammation by the administration of such compounds. It relates also to the synthesis of such substances.

The new aroyl and hetero-aroyl indolyl aliphatic acid secondary and tertiary amides of this invention have the general structural formula

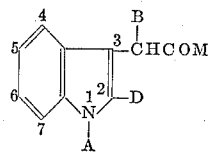

where A is an aroyl or hetero-aroyl radical, B is hydrogen, lower alkyl or lower alkenyl, and M is a secondary or tertiary amido radical, including those in which the nitrogen is part of a hetero-ring. In the preferred compounds, D in the above formula is hydrogen or a hydrocarbon radical having less than nine carbon atoms which may be alkyl, aryl or aralkyl. These substances may be considered as functionally substituted indoles. Alternatively, and preferably, they are described as $\alpha$-(3-indolyl)-lower aliphatic acid amides having an aroyl or hetero-aroyl radical at the 1-position (i.e., the nitrogen atom) of the indole nucleus.

It has previously been found that $\alpha$-(1-acyl-3-indolyl)-aliphatic acids are remarkably good anti-inflammatory agents. The single primary amides of these acids have some activity of the same character but are of principal importance as intermediates for the preparation of the free acids (because of the difficulty in saponifying esters after the 1-acyl group is in place). I have now found that the secondary and tertiary amides of these acids have additional properties, unexpected in view of those of the simple primary amides. The substituted amides are better inflammatory agents. Further, they possess good analgesic properties, a property in which the simple amides are very weak. Furthermore, the secondary and tertiary amides are water soluble. The primary amides and the free acids are not. In fact, because of the sensitivity of the 1-acyl group to alkali, the free acids cannot be readily used in the form of their salts. In contrast, water soluble secondary and tertiary amides are readily preparable. In view of the greatly reduced therapeutic activity of the primary amides, the enhanced activity of the secondary and tertiary amides is most surprising, since the art would be led away from amides by the low activity of the primary amides. These advantages are especially true of the secondary and tertiary amides derived from the more complicated amine structures such as hydroxyalkylamines, polyhydroxyalkylamines, aminoalkylamines, dialkylaminoalkylamines, heterocyclic compounds (such as morpholine, piperazine, piperidine, pyrrolidine, etc.) and the like.

In its more narrow aspects, the present invention embraces indolyl aliphatic acid amides having the structural formula:

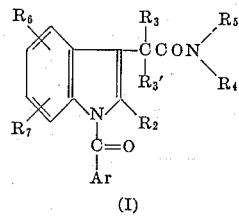

and

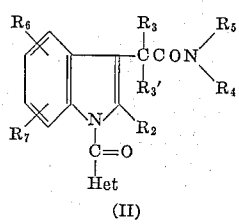

wherein $R_3$ is hydrogen, a lower alkyl, aralkyl, a lower alkenyl group, or together with $R_3'$ part of a cyclopropyl group, $R_3'$ is hydrogen or together with $R_3$ part of a cyclopropyl group, $R_2$ is hydrogen or a hydrocarbon radical having less than nine carbon atoms. Ar is an aryl or substituted aryl ring and Het is an aromatic heterocyclic ring, $R_6$ and $R_7$ are as defined below, $R_4$ is alkyl, substituted alkyl such as hydroxyalkyl, polyhydroxyalkyl, dialkylamino alkyl, dialkylamido carboxyalkyl, cycloalkyl, aryl such as phenyl, alkoxyphenyl, halophenyl, aralkyl such as benzyl, cycloalkyl such as cyclohexyl. $R_5$ may be hydrogen or any of the same radicals as $R_4$, and additionally, $R_4$ and $R_5$ together may be a hetero-ring such as piperidine, piperazine, morpholine, pyrrolidine and the like. The group

may also be part of an amino sugar such as D-glycosamine, D-galactosamine, D-gluocosamine, tetra-o-acetyl-D-glucosamine, 1,3,4,6 - tetraacetyl-o-methyl-D-glucosamine, D-glucosylamine, D-galactoxylamine, D-mannosylamine, D-mannosamine, other hexylamines and pentosamines, their O-acylated derivatives and glycosides.

In the preferred compounds of the invention, $R_6$ and $R_7$ are hydrogen, lower alkyl, lower alkoxy, nitro, amino or substituted amino. Examples of the alkyl and alkoxys are methyl, ethyl, propyl, t-butyl, methoxy, ethoxy, i-propoxy and the like. $R_6$ and $R_7$ are not limited to this class of substituents, however, and may, if desired, represent substituents such as aryl, aryloxy, hydroxy, mercapto, halo, pseudohalo such as $CF_3$, $CHF_2$ or other haloalkyl, nitro, amino, alkylamino, acylamino, haloalkyl, cyano, sulfamyl, sulfoxide, aminomethyl, substituted aminomethyl, carboxy, and carboalkoxy groups.

A critical feature of these compounds is the presence of an aroyl or hetero-aroyl radical attached to the N-1 position of the indole. These acyl groups may be further substituted in the aromatic ring with hydrocarbon groups or with functional substituents. Thus, suitable aroyl substituents are the benzoyl and naphthoyl groups. The aromatic rings of such groups may contain, and in the preferred compounds do contain, at least one functional substituent. This substituent may be a hydroxy or an etherified hydroxy (hydrocarbonoxy) group such as a lower alkoxy, e.g., methoxy, ethoxy, isopropoxy, allyloxy, propoxy, an aryloxy or aralkoxy group, e.g., phenoxy, benzyloxy, halobenzyloxy, lower alkoxybenzyloxy and the like. It may be a nitro radical, a halogen such as chlorine, bromine, iodine or fluorine, an amino group or a substituted amino group, representative examples of which that might be mentioned are acylamino, amine oxide, ketimines, urethanes, lower alkylamino, lower dialkylamino, amidine, acylated amidines, hydrazine or a substituted hydrazine, alkoxyamines and sulfonated amines. Further, it may be a mercapto or a substituted mercapto radical of the type exemplified by alkylthio groups such as methylthio, ethylthio, and propylthio and arylthio or aralkylthio groups, e.g., benzylthio and phenylthio. The N-1 aroyl radical may, if desired, be haloalkylated, as with a trifluoromethyl, trifluoroethyl, perfluoroethyl, β-chloroethyl or like substituent, acylated as with acetyl, propionyl, benzoyl, phenylacetyl, trifluoroacetyl and like acyl groups, or it may contain a haloalkoxy or haloalkylthio substituent. In addition, the invention embraces compounds wherein the aroyl radical contains a sulfamyl, benzylthiomethyl, cyano, sulfonamido or dialkylsulfonamido radical. Further, it may contain a carboxy substituent, or a derivative thereof, such as an alkali metal salt or a lower alkyl ester of the carboxy radical, an aldehyde, azide, amide, hydrazide and the like, or an aldehyde derivative of the type represented by acetals or thioacetals. In the preferred compounds, the N-1 aroyl radical is benzoyl and the functional substituent is in the para position of the six-membered ring.

Alternatively, the N-1 group may be a heteroacyl substituent, and more precisely a heteroaroyl substituent of the formula

where Het represents a five- or six-membered heteroaromatic ring, preferably of less than three fused rings. Examples of such radicals are the furyl, thienyl, pyrryl, thiazolyl, thiadiazolyl, pyrazinyl, pyridyl, alkylpyridyl, pyrazolyl, imidazolyl, oxazolyl, pyrimidinyl and isoxazolyl rings.

The α-(3-indolyl)-aliphatic acids, from which the amides claimed herein are derived, are preferably lower aliphatic acids such as α-(3-indolyl) derivatives of acetic, propionic, butyric, valeric, β-halopropionic, acrylic, 4-pentenoic acid and like acids. These acids are usually prepared through their esters or simple primary amides and are then converted to the secondary or tertiary amides. Alternatively, the secondary or tertiary amides of these acids are synthesized directly, as described below, instead of the esters or primary amides, thus saving the steps of making the free acid and then the desired amide. In this more direct synthesis, the amides included within this invention are conveniently synthesized by first preparing the desired secondary or tertiary amide of an α-(3-indolyl)-lower aliphatic acid unsubstituted at the 1-position and then acylating said compound by the process described hereinbelow. Such amides are conveniently obtained by reacting the free acid with a substituted urea or treating the appropriate acid chloride with the appropriate amine.

The 2-position of the indole ring nucleus (i.e., R₂) may be unsubstituted, although it is preferred that there be present at this position of the molecule a hydrocarbon radical having less than nine carbon atoms. Lower alkyl groups such as methyl, ethyl, propyl or butyl are the most satisfactory but 2-phenyl and 2-benzyl substituted indoles are within the purview of this invention as are indoles having at the 2-position an unsaturated aliphatic radical such as allyl or vinyl or a cyclic aliphatic residue of the type cyclohexyl.

The following compounds are representative of those contemplated by this invention and which may be prepared by the procedure discussed hereinbelow:

α-(1-p-chlorobenzoyl-2-methyl-5-methoxy-3-indolyl)-acetmorpholide,
N-β-hydroxyethyl-α-(1-p-chlorobenzoyl-2,5-dimethyl-3-indolyl)-acetamide,
N-benzyl-α-(1-p-methyl-thiobenzoyl-2-methyl-5-methoxy-3-indolyl-acetamide,
N-β-(N'N'-diethylamino)ethyl-α-(1-p-chlorobenzoyl-2-methyl-5-methoxy-3-indolyl)-propionamide,
N-carbobenzyloxymethyl-α-(1-p-chlorobenzoyl-2-methyl-5-methoxy-3-indolyl)-acetamide,
N-carboxymethyl-α-(1-benzoyl-2-methyl-5-methoxy-3-indolyl)-acetamide,
N-α-[1-(2,4-dichlorobenzoyl)-2-methyl-5-methoxy-3-indolyl] propionyl piperidine,
N'-methyl-N-α-[1-(2'-thenoyl)-2-methyl-5-methoxy-3-indolyl]-acetyl piperazide,
N-α-[1-(4'-thiozolyl)-2-ethyl-5-methyl-3-indolyl]-propionyl pyrrolidone,
N-α-[1-(2'-furoyl)-2,5-dimethyl-3-indolyl]-propionyl piperazine,
α-[1-(nicotinoyl)-2-methyl-5-methoxy-3-indolyl]-acetmorpholide,
α-[1-(naphthoyl)-2-methyl-5-methoxy-3-indolyl]-acetmorpholide,
N-hydroxyethyl-α-[1-(4'-thiazolyl)-2-methyl-5-methoxy-3-indolyl]propionamide,
α-deoxy-2-(1-p-chlorobenzoyl-2-methyl-5-methoxy-3-indole-acetamido)-1,3,4,6-tetra-O-acetyl-D-glucopyranoside.

The α-(1-aroyl or heteroaroyl-3-indolyl)-lower aliphatic acid amides described herein are synthesized either by acylation of the α-(3-indolyl)-lower aliphatic acid amide having the desired substituents at the 2- and 5-positions of the ring nucleus or by acylation of the corresponding acid or its ester followed by conversion to the desired amide. It is preferred to carry out the acylation on an ester or an amide derivative of the lower aliphatic acid. When the acylation is carried out on an ester, this may be converted under suitable reaction conditions to the free acid which may then be converted to the desired amide. It has been observed that the 1-aroyl or heteroaroyl substituent is easily hydrolyzed under conditions normally employed for saponification of an ester to the free acid. For this reason, when this route is used, care must be taken in converting the α-(1-aroyl or heteroaroyl-3-indolyl)-lower aliphatic acid esters to the corresponding free acids. It has been found that one convenient method of accomplishing this conversion comprises acylation of the benzyl ester and subsequent hydrogenolytic removal of the benzyl ester. Alternatively, other esters such as the t-butyl esters, which are amenable to selective removal by other treatment, such as heating above 210° C. or by heating at 25–110° C. in the presence of a catalytic amount of an aryl sulfonic acid or other acids may be utilized. When, instead of an ester, the primary amides of these acids are prepared, the free acids are formed by reaction of these amides with a stoichiometric quantity of nitrous acid in an inert solvent. This entire step, however can be eliminated by forming the desired substituted amide before acylating the indole nitrogen.

The acylation reaction is preferably conducted by treating the α-(3-indolyl)-lower aliphatic acid starting material (whether ester or amide) with an alkali metal hydride such as sodium hydride to form e.g., a sodium salt and then intimately contacting said salt with an aroyl or heteroaroyl acid halide in an anhydrous solvent medium. It is preferred to employ solvents such as dimethylformamide, dimethylformamide-benzene, benzene, toluene or xylene. It is preferred to carry out the acylation at about room temperature although lower tempertaures may be employed if the particular reactants are unduly susceptible to decompositon.

An alternative method of acylating the 1-position is by use of a phenolic ester of the acylating acid, such as the p-nitrophenyl ester. This latter is prepared by mixing the acid and p-nitrophenol in tetra-hydrofuran and adding dicyclohexyl carbodiimide in tetra-hydrofuran slowly. The dicyclohexylurea which forms is removed by filtration and the nitrophenyl ester is recovered from the filtrate. Alternatively, there can also be used the anhydride, azide or thiophenolic ester of the acylating acid. Whichever is used, the acylation of the α-(3-indolyl)-lower aliphatic acid starting material is achieved by forming a sodium salt of said material with sodium hydride in an anhydrous solvent and adding the nitrophenylester.

Formation of the amides may be carried out either before acylation or the acylated ester may be transformed through the free acid into the final amide. The amides are formed by reaction of the acid halide (e.g., the chloride) with the desired amine. The acid, when acylated in the 1-position, can be conveniently transformed into the chloride by exchange with another acid halide such as an alkyl chloroformate. If the acylation is not carried out until after the amide is formed, the 1-unsubstituted indole acid can be subjected to more direct methods such as reaction with thionyl chloride, to form the acid halide. These halides, whether 1-substituted or not are then reacted with the desired amines to form the amides of this invention.

Among the amines which can be used to form the amides of this invention are alkylamines, such as methylamine, ethylamine, propylamine, butylamine and the like and dialkylamines such as dimethylamine, diethylamine, methylethylamine, methylbutylamine, dibutylamine and the like. The principal effect of such alkyl substitution is to enhance the weak anti-inflammatory activity of the simple primary amide to a usable proportion. Analgesic properties are also developed however. Also usable are hydroxylated alkylamines such as ethanolamine, diethanolamine, glucosamine, glycosylamine, glucosylamine and the like. These, too, show enhanced anti-inflammatory activity but also they show enhanced analgesic properties. The more complex amines are more to be desired since they show, remarkably, much more enhanced analgesic activity than anti-inflammatory activity. Among these are such amines as morpholine, N-methyl piperazine, piperazine, N-phenylpiperazine, piperidine, benzylamine, aniline, p-ethoxyaniline, cyclohexylamine, pyrrolidine, N - hydroxyethylpiperazine, carbobenzyloxymethylamine (from which N-carboxymethylamides are formed), N,N - dimethylcarboxamidomethylamine, N,N-diethylaminoethylamine and the like. While the invention encompasses all the substituted amides generally, the preferred class is composed of the amines having at least one N-substituent more complicated than a simple alkyl group.

The enhanced water solubility of these substituted amides, especially with the more complicated structures of the preferred class, permits the formation of solutions for topical application, a mode of using these anti-inflammatory agents which is not readily available with the free acids.

The α-(1-aroyl or heteroaroyl-3-indolyl)-lower aliphatic acid amide compounds of Formulae I and II above have a high degree of analgesic activity as well as some anti-inflammatory activity. They are effective in the alleviation of pain due to inflammation or other cause. Certain of them possess this activity in high degree. In addition, the compounds of this invention have a useful degree of antipyretic activity as well as some anti-inflammatory activity. For these various purposes, they are normally administered orally in tablets, or capsules, the optimum dosage depending, of course, on the particular compound being used and the type and severity of infection being treated. Although the optimum quantities of these compounds of this invention to be used in such manner will depend on the compound employed and the particular type of disease condition treated, oral dose levels of preferred compounds in the range of 10–2000 mg. per day are useful, depending on the activity of the specific compound and the reaction sensitivity of the patient. They can also be administered topically in aqueous solution.

The indolyl aliphatic acid compounds employed as starting material in the reaction discussed above, and having the formula:

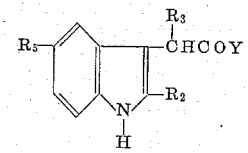

where $R_2$, $R_3$ and $R_5$ have the previously defined meanings and Y is a hydrocarbonoxy radical having less than nine carbon atoms or —$NH_2$, or

in which $R_4$ and $R_5$ have the previously defined meanings, may be synthesized in various ways. When $R_2$ is hydrogen, methyl, aryl or aralkyl it is preferred to form such compounds by reacting together an appropriately substituted phenylhydrazine (III) and a compound of Formula IV to form an intermediate phenylhydrazone which cyclizes under the reaction conditions to the indole compound:

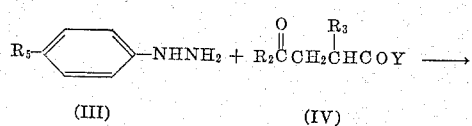

(III)  (IV)

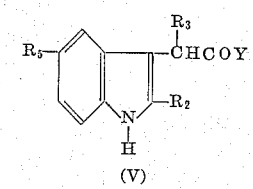

(V)

where $R_3$, $R_5$ and Y are as above, and $R_2$ is hydrogen, methyl, aryl, or aralkyl. The reaction is normally carried out in a lower alkanol such as methanol, ethanol, isopropanol or butanol containing an acid such as hydrochloric, hydrobromic, sulfuric or acetic acid or in aqueous mineral acid such as concentrated hydrochloric, hydrobromic, sulfuric or acetic acid, or other Lewis acids such as $ZnCl_2$, $BF_3$, $SnCl_4$ and the like. The acid serves as a catalyst in the condensation and ring closure reactions leading to the indole Compound V. When Compound IV is an ester, the nature of the ester is not critical, although it is preferred to utilize a lower alkyl ester, e.g., the methyl, ethyl, propyl, isobutyl or isopropyl compound. To avoid the possibility of transesterification the alcohol used as the solvent medium is preferably the same as the alcohol moiety of the ester. When $R_2$ is hydrogen, it is convenient to employ the aldehyde in the form of an acetal, e.g., methyl γ,γ-dimethoxy butyrate. An acid addition salt of the phenylhydrazine reactant, for example, the hydrochloride, is normally preferred over the free base for practical reasons, one of which is that many of these will undergo the indole synthesis without needing added catalyst. Such salts and the base are otherwise equivalent in the reaction itself.

Formation of the α-(3-indolyl)-aliphatic acid amide or ester is brought about at elevated temperatures, good results being obtained by refluxing the reaction mixture for at least about 15 minutes. Longer reaction times are not harmful and may be used if desired. The desired compound is recovered from the reaction mixture and purified by techniques such as solvent extraction, chromatography and/or distillation. Since the esters of Formula V are low melting solids, they are conveniently purified by distillation under reduced pressure. They are saponified by treatment with an alkali metal hydroxide.

The substituted phenylhydrazines employed as one of the starting materials in this synthesis are prepared by known methods. One convenient method is by diazotization of the appropriately substituted aniline to give the diazo compound, treatment of the latter with stannous chloride to form a tin complex, and decomposition of this complex to the phenylhydrazine with sodium hydroxide.

The 1-acyl group in $\alpha$-(1-acyl-3-indolyl)aliphatic acids and esters of this invention are, as has been mentioned earlier, easily hydrolyzed under the conditions normally used to saponify an ester. For this reason, the benzyl esters of the intermediate $\alpha$-(1-unsubstituted-3-indolyl) acids are convenient starting materials. These are obtained by forming the free $\alpha$-(1-unsubstituted-3-indolyl) aliphatic acid and esterifying this with benzyl alcohol in an inert solvent with an acid catalyst (sulfuric, aryl sulfonic acid, etc.). Alternatively, the intermediate benzyl ester is synthesized directly by using the benzyl ester of the proper levulinic acid in the original synthesis of the indole ring, or is formed by base catalyzed ester exchange from other esters. After acylation of the indole nitrogen of these benzyl ester intermediates, the benzyl group can be removed cleanly by hydrogenolysis, a process which leaves the 1-acyl group untouched.

Alternatively, it is possible to produce first an indole of the formula

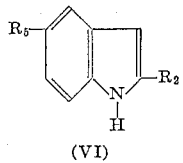

(VI)

where $R_2$ and $R_5$ have the same meaning, and then introduce the carboxylic acid residue at the 3-position. This is accomplished by treating the indole of Formula VI under Mannich reaction conditions with formaldehydedialkylamine to produce a substituted gramine, subsequently reacting this latter compound with an alkali metal cyanide in a lower alkanol, and finally hydrolyzing with a strong base such as sodium or potassium hydroxide.

While this method of introducing the aliphatic acid residue at the 3-position after elaboration of the indole ring is, of course, generally applicable to compounds having the structure shown above, it is particularly useful for making compounds of this invention wherein $R_2$ is an alkyl radical other than methyl, such as the 2-ethyl, 2-propyl, 2-allyl and like substances. Compounds of Formula VI are readily prepared following the procedures set forth in columns 2 and 3 of U.S. Patent No. 2,825,734. Products where $R_5$ is acyloxy, halo, cyano, carboxy, carbalkoxy, alkyl, aryl, aralkyl, nitro or hydrocarbonoxy are prepared via the synthesis beginning from a substituted 2-nitro benzaldehyde or 2-nitrotoluene.

The synthesis of various compounds of this invention having on the indole ring system a 5-substituent which has a nitrogen attached to the homocyclic ring of the indole is generally based on the 5-nitro compound. This is transformed into the desired 5-substituent. Such transformation may be before or after acylation of the 1-position, or before or after the introduction of the substituted amide group, depending on the extent to which the desired 5-substituent may interfere with these reactions. If such interference is possible, the 1-acylation and/or the amide formation should be carried out on the 5-nitro indole and the nitro later transformed into the desired 5-substituent. Such transformation can be carried out in a number of ways. Reduction of the 5-nitro groups gives a 5-amino group. Reaction of the amino with alkyl halides give mono and dialkyl amino groups. If the alkyl halide is a dihaloalkylene group (e.g. 1,4-dibromobutane) a heterocyclic ring (e.g. pyrrolidino) is formed. Similarly, bis($\beta$-chlorethyl)ether will give an N-morpholino compound. Alkylation can also be carried out simultaneous with reduction, as e.g. with formaldehyde and Raney nickel and hydrogen. Acylation can similarly be carried out on the 5-amino compounds or on the 5-nitro (with simultaneous reduction) to give 5-acylamido compounds. The 5-amino group can be reacted with isocyanates to give 5-ureido compounds.

The following examples are given for purposes of illustration and not by way of limitation:

EXAMPLE 1

A. *Ethyl - $\alpha$ - (2-methyl-5-methoxy-3-indolyl)-propionate.*—A solution of 25 g. of p-methoxyphenylhydrazine hydrochloride and 20 g. of ethyl $\alpha$-methyl levulinate in 250 ml. of 2 N ethanolic hydrochloride is heated on a steam bath for a few minutes. An exothermic reaction takes place with the separation of ammonium chloride. The reaction flask is removed from the steam bath and the mixture allowed to reflux gently until the initial reaction subsides. The mixture is again heated on a steam bath under reflux for 30 minutes, and then concentrated in vacuo to a volume of about 80 ml. The concentrate is diluted with about 400 ml. of water and extracted with ether. The resulting ethereal extract is washed with a saturated solution of sodium bicarbonate, and with water, and dried over anhydrous sodium sulfate. The dried solution is filtered and evaporated to a dark brown syrup which is purified by chromatography over about 1 lb. of acid-washed alumina in a 2¼″ I.D. column using mixtures of ether and petroleum ether (v./v. 1:9 to 1:1) as eluent. The light yellow syrup so obtained is distilled in a short-path distillation apparatus and the product collected at B.P. 150–153° C. (0.25 mm.). The distillate of ethyl - $\alpha$ - (2-methyl-5-methoxy-3-indolyl)-propionate crystallizes on trituration with petroleum ether, M.P. 53–55.5° C. On recrystallization from a mixture of ether and petroleum ether the melting point is unchanged.

Calcd. for $C_{15}H_{19}O_3N$: C, 68.94; H, 7.33; N, 5.36. Found C, 69.23; H, 7.31; N, 5.60.

When the methyl, propyl, isopropyl or benzyl ester of $\alpha$-methyl levulinic acid is employed in the above reaction in place of the ethyl ester, there is obtained methyl-$\alpha$-(2-methyl - 5 - methoxy - 3 - indolyl) - propionate, propyl-$\alpha$-(2 - methyl - 5 - methoxy-3-indolyl)-propionate, isopropyl-$\alpha$ - (2 - methyl - 5 - methoxy-3-indolyl)-propionate, or benzyl - $\alpha$ - (2-methyl-5-methoxy)-3-indolyl)-propionate, respectively. Alternatively, when an ester of levulinic acid is used as starting material in the above process, the corresponding ester of $\alpha$-(2-methyl-5-methoxy-3-indolyl)-acetic acid is obtained.

B. *Ethyl - $\alpha$ - (2,5-dimethyl-3-indolyl)-propionate.*—20 g. of p-methylphenylhydrazine hydrochloride and 20 g. of ethyl $\alpha$-methyl levulinate are added to 250 ml. of 2 N ethanolic hydrogen chloride and the mixture warmed until reaction sets in. After the initial exothermic reaction stops, the mixture is refluxed for about ½ hour and then concentrated in vacuo to about ⅓ volume. 400 ml. of water are added and the aqueous solution extracted with ether. The ether extracts are washed with sodium bicarbonate solution, and with water, then dried over sodium sulfate. The ether solution is concentrated to a small volume in vacuo and chromatographed over acid-washed alumina (1 lb. of alumina in a 2¼″ I.D. column). The material eluted with ether-petroleum ether (v./v. 9:1 to 1:1( is distilled in a short-path distillation apparatus.

Ethyl - α - (2,5-dimethyl-3-indolyl)-propionate distills at 150–170° (bath temp.)/1 mm., and crystallizes on trituration with petroleum ether, M.P. 88–88.5° C.

When a lower alkyl or benzyl levulinate is employed in place of ethyl α-methyl levulinate, a lower alkyl- or benzyl-(2,5-dimethyl-3-indolyl)-acetate is produced.

EXAMPLE 2

*Ethyl-α-(1-p-methylthiobenzoyl-2-methyl-5-methoxy-3-indoyl)-propionate*

A suspension of 2.3 g. (0.046 m.) of 50% sodium hydride-mineral oil in 250 ml. of dimethylformamide is stirred for 20 minutes under nitrogen with ice-cooling. Then 8.64 g. (0.035 m.) of ethyl-α-(2-methyl-5-methoxy-3-indolyl)-propionate is added and the mixture stirred for 20 minutes. 8.6 g. (0.046 m.) of p-methylthionbenzoyl chloride in 50 ml. of dimethylformamide is added dropwise over a period of 30 minutes. The mixture is stirred in an ice-bath for 5 hours under nitrogen. It is then poured into a mixture of 500 ml. of ether, 5 ml. of acetic acid and 1 l. of iced water. The organic products are extracted with 3 x 300 ml. of ether. The ether solutions are combined and washed with a large quantity of water, and dried over sodium sulfate. The solution is filtered, evaporated to near dryness and the residue charged onto a 300 g. alumina column. The ethyl-α-(1-p-methylthiobenzoyl-2-methyl-5-methoxy - 3-indolyl)-propionate is eluted with 10% ether in petroleum ether. It is obtained as a yellow oil on concentration of the eluates to dryness.

The p-methylthiobenzoyl chloride starting material is obtained by heating a mixture of 27 g. (0.15 m.) of p-methylthiobenzoic acid and 21.4 g. (0.18 m.) of thionyl chloride on a steam bath for 1 hour. About 20 ml. of benzene is than added and boiled off. The remaining solution is centrifuged and diluted with petroleum ether. On cooling, the acid chloride separates, M.P. 40–44° C.

When methyl - (2-methyl-5-methoxy-3-indolyl)-acetate is employed as the starting material in the above process, there is obtained methyl-(1-p-methylthiobenzoyl-2-methyl-5-methoxy-3-indolyl)-acetate.

EXAMPLE 3

*Methyl-α-(1-p-chlorobenzoyl-2-methyl-5-methoxy-3-indolyl)-acetate*

To 3.9 g. (0.078 m.) of 51% sodium hydride-mineral oil suspended in 150 ml. of distilled dimethylformamide, in a 1 liter 3-neck flask, is added with stirring at 0° C. 9.5 g. (0.040 m.) of methyl-(2-methyl-5-methoxy-3-indolyl)-acetate in 150 ml. of dimethylformamide. The mixture is allowed to stir for 1 hour and then 9.1 g. (0.052 m.) of p-chlorobenzoyl chloride in 50 ml. of dimethylformamide is added dropwise over a period of 30 minutes. The reaction mixture is stirred another 30 minutes at 0° C. and then allowed to stand 12 hours in the cold.

The reaction mixture is then filtered and the solids washed with ether. The ether is added to the filtrate which is then washed with water and dried over sodium sulfate. After filtering off the sodium sulfate, approximately 75 g. of acid-washed alumina is added to the ethereal solution and this mixture concentrated to dryness. The indole-coated alumina is then packed on top of a column of 400 g. of alumina. The column is eluted with petroleum ether containing increasing amounts of ethyl ether. Methyl-α-(1-p-chlorobenzoyl-2-methyl-5-methoxy-3-indolyl)-acetate is eluted with 15% ether-petroleum ether. These latter eluates are combined and concentrated to dryness. Recrystallization of the residue from benzene-petroleum ether yields substantially pure methyl-α - (1-p-chlorobenzoyl-2-methyl-5-methoxy - 3 - indolyl)-acetate, M.P. 99–100° C.

Carrying out the above-noted process with ethyl-α-(2-methyl-5-methoxy-3-indolyl) - propionate or benzyl-α-(2,5-dimethyl-3-indolyl)-propionate yields, respectively, ethyl - α - (1 - p - chlorobenzoyl-2-methyl-5-methoxy-3-indolyl) - propionate and benzyl-α-(1-p-chlorobenzoyl-2,5-dimethyl-3-indolyl)-propionate.

EXAMPLE 4

*Ethyl-α-[1-(o-methyl-p-methylthiobenzoyl)-2-methyl-5-methoxy-3-indolyl]-propionate*

A mixture of 100 ml. of dimethylformamide, 5.2 g. (0.02 m.) of ethyl-α-(2-methyl-5-methoxy-3-indolyl)-propionate and 1.2 g. (0.025 m.) of sodium hydride in mineral oil (50% dispersion) is stirred in an ice-bath under nitrogen for 1 hour. A solution of 4.0 g. (0.02 m.) of 2-methyl-4-methylthiobenzoyl chloride (prepared from the acid, M.P. 159–162° C., and thionyl chloride) and 25 ml. of dimethylformamide is then added during 0.5 hour, and stirring is continued for 16 hours at room temperature. The mixture is poured into 350 ml. of water, extracted with ether, and the ether solution washed with water, dried over magnesium sulfate, filtered and evaporated to dryness under reduced pressure. The residual oil is dissolved in petroleum ether (60–70° C.) and chromatographed on 250 g. of acid-washed alumina. The ethyl - α - [1-(o-methyl-p-methylthiobenzoyl)-2-methyl-5-methoxy-3-indolyl]-propionate is eluted with 15% ether in petroleum ether and isolated as an oil.

I.R. $\lambda_{max.}^{CHCl_3}$ 5.77 (CO), 5.94 (CO), 6.21, 6.73

EXAMPLE 5

*Ethyl-α-(1-benzoyl-2-methyl-5-methoxy-3-indolyl)-propionate*

To a solution of 5.22 g. of ethyl-α-(2-methyl-5-methoxy-3-indolyl)-propionate in 20 ml. of dimethylformamide is added a suspension of 1.2 g. of 51% sodium hydride in mineral oil in 40 ml. of dimethylformamide. After 1 hour of stirring at room temperature, a solution of 2.88 ml. of benzoyl chloride in 10 ml. of dimethylformamide is added to initiate a mild exothermic reaction with precipitation of sodium chloride. The reaction mixture is stirred for 6 hours followed by standing overnight. The mixture is poured into about 200 g. of ice and extracted with ether three times. The ethereal solution is washed with water, sodium bicarbonate and dried over potassium carbonate. After filtration the solution is evaporated to a syrup and chromatographed on a column of 100 g. of acid-washed alumina, using mixtures of benzene-petroleum ether (2:1 to 3:1 v./v.) as eluent. A total of 1.06 g. of ethyl-α-(1-benzoyl-2-methyl-5-methoxy-3-indolyl)-propionate is obtained as a thick yellow oil. The infrared spectrum shows no N—H absorption near the 2.8–3μ region but shows strong C=O absorptions at 5.8 and 5.95μ characteristic for ester and amide functional groups, respectively.

EXAMPLE 6

*Ethyl-α-(1-p-chlorobenzoyl-2-methyl-5-methoxy-3-indolyl)-propionate*

13 g. of ethyl-(2-methyl-5-methoxy-3-indolyl)-propionate is added to a mixture of 2.5 g. of 51% sodium hydride-mineral oil emulsion in 240 ml. of dimethylformamide. The resulting mixture is stirred at room temperature for 30 minutes and then a solution of 8.75 g. of p-chlorobenzoyl chloride in 50 ml. of dimethylformamide is added slowly thereto over a 40-minute period. The mixture is then stirred in an ice-bath for 4 hours under nitrogen. It is then poured into a mixture of ether, acetic acid and water as described in Example 2. Following the work-up procedure and using a 200 g. column of alumina for the chromatography step, and eluting with a mixture of 1:1 benzene-petroleum ether, ethyl-α-(1-chlorobenzoyl - 2 - methyl-5-methoxy-3-indolyl)-propionate is obtained as a yellow oil.

EXAMPLE 7

*(1-benzoyl-2-methyl-5-methoxy-3-indolyl)-acetic acid*

A. A solution of 15 g. of methyl-(2-methyl-5-methoxy-3-indolyl)-acetate and 0.2 g. of sodium in 60 ml. of benzyl alcohol is slowly fractionated over a period of 4½ hours through a Vigreux column to remove methanol. The excess benzyl alcohol is then removed by distillation at 60° C. (2.5 mm.) to give a residue of 18.6 g. of benzyl-(2-methyl-5-methoxy-3-indolyl)-acetate.

B. 10 g. of the benzyl ester obtained above is added to 3.3 g. of 51% sodium hydride-mineral oil emulsion in 260 ml. of dimethylformamide according to the procedure of Example 2. This mixture is treated as described in that example with 7.7 ml. of p-chlorobenzoyl chloride and the reaction mixture worked up by the above-described process using a chromatographic column of 340 g. of alumina and eluting with 20–30% ether in petroleum ether. From these eluates there is obtained benzyl-(1-benzoyl-2-methyl-5-methoxy-3-indolyl)-acetate, M.P. 91–92° C.

C. 1.5 g. of the ester obtained in Part B above is added to 20 ml. of ethyl acetate containing a drop of acetic acid and reduced catalytically at room temperature in the presence of palladium on charcoal catalyst. When the reduction is complete the catalyst is removed by filtration and the filtrate evaporated to a crystalline residue. This residue is recrystallized from aqueous ethanol to give 1-benzoyl-(2 - methyl-5-methoxy - 3 - indolyl)-acetic acid, M.P. 172–173° C. Alternatively, the residue obtained on removal of the reaction solvent may be purified by dissolving in chloroform and precipitating by addition of petroleum ether to the chloroform solution.

EXAMPLE 8

*Ethyl-α-(1-p-fluorobenzoyl-2-methyl-5-methoxy-3-indolyl)-propionate*

10.5 g. of ethyl-α-(2-methyl-5-methoxy-3-indolyl)-propionate is added to a suspension of 2.2 g. of 51% sodium hydride-mineral oil emulsion in 240 ml. of dimethylformamide. After stirring for 25 minutes, 7.5 g. of p-fluorobenzoyl chloride is added thereto slowly over a 40-minute period, and the resulting mixture stirred for 40 minutes at 10–15° C. The reaction mixture is then poured into 400 ml. of water and the product isolated as described in Example 4 to give substantially pure ethyl-α-(1-p-fluorobenzoyl-2-methyl-5-methoxy-3-indolyl)-propionate.

When the above process is carried out by reacting the sodium salt of methyl-α-(2-methyl-5-methoxy-3-indolyl)-propionate with p-trifluoromethylbenzoyl chloride, there is obtained methyl - α - (1 - p - trifluoromethylbenzoyl-2-methyl-5-methoxy-3-indolyl)-propionate.

EXAMPLE 9

The corresponding N-1 aroyl or hetero-aroyl derivatives of benzyl-α-(2-methyl-5-methoxy-3-indolyl)-propionate and benzyl-(2-methyl-5-methoxy-3-indolyl)-acetate are obtained by reacting together in equimolar amounts and according to the procedure of Example 3, the sodium salts of these esters and one of the compounds:

3,4,5-trimethoxy benzoyl chloride,
p-phenoxy benzoyl chloride,
p-trifluoroacetyl benzoyl chloride,
p-N,N-dimethylsulfamyl benzoyl chloride,
3-furoyl chloride,
1-methylimidazol-5-carboxylic acid chloride,
1,3-dimethyl-2,3-dihydro-2-oxoimidazole-4-carboxylic acid chloride,
1-methylbenzamidazole-2-carboxy chloride,
5-fluoro-2-thenoyl chloride,
3-thenoyl chloride,
5-nitro-2-furoyl chloride,
1-methylindazole-3-carboxy chloride,
1-methyl-6-nitroindazole-3-carboxy chloride,
oxazole-4-carboxy chloride,
benzoxazole-2-carboxy chloride,
thiazole-4-carboxy chloride,
thiazole-2-carboxy chloride,
2-phenylthiazole-4-carboxy chloride,
2-benzylmercaptothiazole-4-carboxy chloride,
p-acetylbenzoyl chloride,
N,N-dimethyl-p-carboxamidobenzoyl chloride,
p-cyanobenzoyl chloride,
p-carbomethoxybenzoyl chloride,
p-formylbenzoyl chloride,
p-trifluoromethylthiobenzoyl chloride,
N,N-dimethyl-p-sulfonamidobenzoyl chloride,
p-methylsulfinylbenzoyl chloride,
p-methylsulfonylbenzoyl chloride,
p-benzylthiobenzoyl chloride,
p-mercaptobenzoyl chloride,
p-nitrobenzoyl chloride,
p-dimethylaminobenzoyl chloride,
p-acetaminobenzoyl chloride,
o-fluoro-p-chlorobenzoyl chloride,
o-methoxy-p-chlorobenzoyl chloride,
o-hydroxy-p-chlorobenzoyl chloride,
2,4,5-trichlorobenzoyl chloride.

The resulting 1-substituted indolyl esters are converted to the corresponding free acids by the procedure of Example 7C.

EXAMPLE 10

*1-p-chlorobenzoyl-2-methyl-5-methoxy-3-indolyl-acetic acid*

(A) *2-methyl-5-methoxy-3-indolylacetic anhydride.*—Dicyclohexylcarbodiimide (10 g., 0.049 mole) is dissolved in a solution of 2-methyl-5-methoxy-3-indolylacetic acid (22 g., 0.10 mole) in 200 ml. of THF, and the solution is allowed to stand at room temperature for 2 hours. The precipitated urea is removed by filtration, and the filtrate is evaporated in vacuo to a residue and flushed with Skellysolve B. The residual oily anhydride is used without purification in the next step.

(B) *t-Butyl 2-methyl-5-methoxy-3-indolylacetate.*—t-Butyl alcohol (25 ml.) and fused zinc chloride (0.3 g.) are added to the anhydride from part A. The solution is refluxed for 16 hours and excess alcohol is removed in vacuo. The residue is dissolved in ether, washed several times with saturated bicarbonate, water, and saturated salt solution. After drying over magnesium sulfate, the solution is treated with charcoal, evaporated, and flushed several times with Skellysolve B for complete removal of alcohol. The residual oily ester (18 g., 93%) is used without purification.

(C) *t-Butyl 1-p-chlorobenzoyl-2-methyl-5-methoxy-3-indolylacetate.*—A stirred solution of ester (18 g., 0.065 mole) in dry DMF (450 ml.) is cooled to 4° in an ice bath, and soduim hydride (4.9 g., 0.098 mole, 50% susp.) is added in portions. After 15 minutes, p-chlorobenzoyl chloride (15 g., 0.085 mole) is added dropwise during 10 minutes, and the mixture is stirred for 9 hours without replenishing the ice bath. The mixture is then poured into 1 l. of 5% acetic acid, extracted with a mixture of ether and benzene, washed thoroughly with water, bicarbonate, saturated salt, dried over magnesium sulfate, treated with charcoal, and evaporated to a residue which partly crystallizes. This is shaken with ether, filtered, and the filtrate is evaporated to a residue (17 g.) which solidifies after being refrigerated overnight. The crude product is boiled with 300 ml. of Skellysolve B, cooled to room temperature, decanted from some gummy material, treated with charcoal, concentrated to 100 ml., and allowed to crystallize. The product thus obtained (10 g.) is recrystallized from 50 ml. of methanol and gives 4.5 g. of analytically pure material, M.P. 103–4°.

(D) *1-p-chlorobenzoyl-2-methyl-5-methoxy-3-indolyl-acetic acid.*—A mixture of 1 g. ester and 0.1 g. powdered porous plate is heated in an oil bath at 210° with magnetic stirring under a blanket of nitrogen for about 2 hours. No intensification of color (pale yellow) occurs during this period. After cooling under nitrogen, the product is dissolved in benzene and ether, filtered, and extracted with bicarbonate. The aqueous solution is filtered with suction to remove ether, neutralized with acetic acid, and then acidified weakly with dilute hydrochloric acid. The crude product (0.4 g., 47%) is recrystallized from aqueous ethanol and dried in vacuo at 65°; M.P. 151°.

EXAMPLE 11

*1-p-methylthiobenzoyl-2-methyl-5-methoxy-3-indolyl-α-propionic acid*

(A) *2-methyl-5-methoxy-3-indolyl-α-propionic anhydride.*—Dicyclohexylcarbodiimide (9 g., 0.044 mole) is dissolved in a solution of 2-methyl-5-methoxy-3-indolyl-α-propionic acid (21 g., 0.09 mole) and 200 ml. of THF, and the solution is allowed to stand at room temperature for 2 hours. The precipitated urea is removed by filtration, and the filtrate is evaporated in vacuo to a residue and flushed with Skellysolve B. The residual oily anhydride is used without purification.

(B) *t-Butyl 2-methyl-5-methoxy-3-indolyl-α-propionate.*—t-Butyl alcohol (25 ml.) and fused zinc chloride (0.3 g.) are added to the above anhydride. The solution is refluxed for 16 hours, and excess alcohol is removed in vacuo. The residue is dissolved in ether, washed several times with saturated bicarbonate, water and saturated salt solution. After drying over magnesium sulfate the solution is treated with charcoal, evaporated, and flushed several times with Skellysolve B for complete removal of alcohol. The residual oily ester (14 g.) is used without purification.

(C) *t-Butyl 1-p-methylthiobenzoyl-2-methyl-5-methoxy-3-indolyl-α-propionate.*—A stirred solution of ester from part "B" (20 g., 0.69 mole) in 450 ml. of dry dimethylformamide is cooled to 4° in an ice bath and sodium hydride (5.2 g., 0.10 mole, 50% susp.) is added in portions. After the mixture is stirred for 10 minutes, p-methylthiobenzoyl chloride (M.P. 51°; 17 g., 0.091 mole) is added in portions during 10 minutes, and the mixture is stirred for 7 hours at room temperature without replenishing the ice bath. The mixture is then poured into 1 l. of 5% acetic acid, extracted with ether, washed thoroughly with water, bicarbonate, saturated salt solution, dried over magnesium sulfate, treated with charcoal, and evaporated in vacuo to a residue (33 g.). This is dissolved in ether, mixed with 100 g. of acid washed alumina, and evaporated in vacuo to dryness, which is placed above a column of 300 g. of acid washed alumina in Skellysolve B. After washing with Skellysolve B, the product is eluted with 5% ether-Skellysolve B, and is obtained as a yellow oil (11 g., 36%).

(D) *1-p-methylthiobenzoyl-2-methyl-5-methoxy-3-indolyl-α-propionic acid.*—The pyrolysis is carried out in the same manner as with t-butyl 1-p-chlorobenzoyl-2-methyl-5-methoxy-3-indolyl acetate (of Example 10D). The product is recrystallized from aqueous ethanol or benzene-Skellysolve B; M.P. 175–6°.

EXAMPLE 12

*1-p-chlorobenzoyl-2-methyl-5-methoxy-3-indolyl-α-propionic acid*

(A) To a solution of 20.0 g. (0.07 mole) of t-butyl-α-(2-methyl-5-methoxy-3-indolyl)-propionate in 270 ml. dimethylformamide is added in small portions 7.0 g. (0.14 mole) of 51% sodium hydride in mineral oil under N₂ with stirring and ice-cooling. After 15 minutes, 17.5 g. (0.10 mole) of the p-chlorobenzoyl chloride is added dropwise, a white precipitate separates out almost immediately. The mixture is stirred at 0° for 2 hours and is allowed to stand in the cold room overnight. The next morning the mixture is filtered and diluted with ether. *One-half* of the solution is washed with water, sodium bicarbonate, water successively and dried over sodium sulfate. The dried solution is concentrated to a syrup which is chromatographed on 400 g. of acid-washed alumina. After mineral oil and traces of impurity are eluted by petroleum ether and 5% ether in petroleum ether, the desired product is obtained by elution with 10% ether in petroleum ether as yellow oil. The other half is similarly treated.

(B) The above ester and a few pieces of porous plate chips are placed in a test tube submerged in an oil bath. A steady stream of N₂ is introduced into the test tube through the opening while the temperature of the oil bath is slowly raised to 215°. After ½ hour at 215°, the mixture is dissolved in ether, filtered and washed with sodium bicarbonate. The bicarbonate extract is acidified with dilute hydrochloric acid, and the precipitate is taken into ether, washed with water, dried over sodium sulfate and evaporated to dryness. The solid residue is recrystallized from a mixture of benzene and petroleum ether to give the desired acid, M.P. 87–88°.

EXAMPLE 13

*Methyl-(1-isonicotinyl-2-methyl-5-methoxy-3-indolyl) acetate*

(A) In a 500 ml. round bottom flask (all equipment flame dried) is added 13.9 g. of p-nitrophenol and 12.3 g. isonicotinic acid in 250 ml. dry tetrahydrofuran. Through a dropping funnel is added over 30 minutes 20.6 g. of dicyclohexylcarbodiimide in 100 ml. of dry tetrahydrofuran. The reaction is allowed to run overnight with stirring. The dicyclohexylurea which forms during the reaction is filtered. The filter cake is washed with dry tetrahydrofuran. The solution is evaporated to dryness. The solid is taken up in benzene and washed with sodium bicarbonate solution and then with water and dried over anhydrous sodium sulfate. The solution is concentrated under vacuum to dryness. The solid p-nitrophenylisonicotinate is then recrystallized from benzene, M.P. 126–127° C.

(B) In a 250 ml. round bottom flask (flame dried equipment) is placed at 0° C. with nitrogen, 100 ml. of dry dimethylformamide with 10.5 g. of methyl-α-(2-methyl-5-methoxy-3-indolyl) acetate. To this is added 2.5 g. of 50% sodium hydride mineral oil mixture. After the mixture is stirred for 30 minutes there is added over 15 minutes a solution of 11 g. of p-nitrophenylisonicotinate in 50 ml. dry dimethylformamide. The reaction mixture is stirred for 4 hours at 0° C. under nitrogen followed by stirring under nitrogen at room temperature over night. The reaction mixture is then poured into an ice water-ether solution containing a few ml. of acetic acid and the layers are separated. The aqueous phase is washed with ether and the ether extracts are combined. To the ether layers is added a saturated solution of hydrogen chloride gas in dry ether. The ether is decanted off, leaving a heavy oil. The oil is washed with ether followed by an addition of aqueous sodium bicarbonate solution. The product is then extracted with ether. The ether layer is dried over anhydrous sodium sulfate and concentrated to dryness. The product is crystallized from dry ether, M.P. 114–115° C. *Microanalysis.*—Calc. C, 67.45; H, 5.37; N, 8.28. Found: C, 67.67; H, 5.50; N, 8.14.

EXAMPLE 14

*Methyl-(2-methyl-5-nitro-3-indolyl) acetate*

A solution of 40 g. of levulinic acid in 300 ml. of hot water is added to a solution of 65 g. of p-nitrophenylhydrazine hydrochloride in 700 ml. of hot water with stirring. After about one-half hour, the hydrazone derivative is collected in a filter, washed with water and dried at 110° in vacuo. The yield is 84 g., M.P. 175–179°.

An amount of 42 g. of the above hydrazone is added to a solution of 120 g. of fused zinc chloride in 100 ml. of absolute ethanol and the mixture is refluxed for 18 hours. The cooled solution is poured into dilute hydrochloric acid with stirring, and the insoluble gummy material separated is extracted with hot ethanol. The ethanolic extract is evaporated in vacuo to a syrup, which is redissolved in ether. The ether solution is extracted with 10% sodium carbonate several times. Acidification of the aqueous solution gives a crude product which recrystallizes from chloroform to give (2-methyl-5-nitro-3-indolyl)acetic acid, M.P. 238°.

The above acid is treated with a mixture of 3 g. of sulfuric acid and 40 ml. of methanol at the reflux temperature for 6 hours. The methyl ester is obtained as a yellow crystalline product, M.P. 132–40° after recrystallization from benzene.

Similarly, methyl-α-(2-methyl-5-nitro-3-indolyl)-propionate is prepared by using an equivalent amount of α-methyl levulinic acid as the starting material.

EXAMPLE 15

*Methyl-(2-methyl-5-amino-3-indolyl) acetate*

3 g. of methyl-(2-methyl-5-nitro-3-indolyl) acetate is dissolved in 300 ml. dry methanol and reduced in hydrogen in an autoclave with Raney nickel as catalyst. After the theoretical amount of hydrogen is taken up the catalyst is removed by filtration. The catalyst and reaction flask are washed with methanol. The methanol solution is evaporated to dryness. The product is crystallized from benzene, M.P. 144–145°. *Microanalysis.*—Calc. C, 66.03; H, 6.47; N, 12.84. Found: C, 65.96; H, 6.29; N, 12.56.

EXAMPLE 16

*Methyl-[2-methyl-5-(1'-pyrrolidino)-3-indolyl] acetate*

In a 125 ml. flask is placed 80 ml. of ethanol. To this is added 1.0 g. of methyl-(2-methyl-5-amino-3-indolyl) acetate, 0.99 g. of 1,4-dibromobutane and 0.975 g. of anhydrous sodium carbonate. This mixture is stirred at reflux temperature in a nitrogen atmosphere for 6 hours. The reaction mixture is then filtered and the filtrate is concentrated in vacuo to a small volume and diluted with ether. This solution is then washed with water 2×, dried with anhydrous sodium sulfate and concentrated in vacuo to dryness. The product is absorbed on 6 g. of silica gel. The product is then chromatographed over 30 g. of silica gel using as elutant from v./v. 3:1 ether-petroleum ether to ether. The eluted material is combined and crystallized from benzene-Skellysolve B, M.P. 117–118° *Microanalysis.*—Calc. C, 70.56; H, 7.40; N, 10.29. Found: C, 70.77; H, 7.72; N, 10.00.

When ethylene dibromide is used instead of dibromobutane, the product obtained is the 5-(1-azacyclopropyl) indolyl compound.

EXAMPLE 17

*Methyl-(1-p-chlorobenzoyl-2-methyl-5-(1'-pyrrolidino) 3-indolyl) acetate*

In a dry 125 ml. flask is placed 1.2 g. of methyl-(2-methyl-5-(1'-pyrrolidino)-3-indolyl) acetate in 60 ml. of dry dimethylformamide. To this solution, cooled to 0° C., is added 0.23 g. of 50% sodium hydride slurry in mineral oil. This mixture is stirred for 30 minutes. Then a solution of 0.8 g. of p-chlorobenzoyl chloride diluted with 5 ml. of dry dimethylformamide is added dropwise. This reaction is stirred for 4 hours at 0° C. under a nitrogen atmosphere. The reaction mixture is then stirred overnight at room temperature under a nitrogen atmosphere. The reaction mixture is added to an ice water-ether mixture containing a few milliliters of acetic acid.

The ether layer is separated and the aqueous layer is washed with ether. The combined ether layers are washed once with sodium carbonate and twice with water, dried over anhydrous sodium sulfate and evaporated in vacuo to an oil. The product is absorbed on 10 g. of silica gel and chromatographed from 60 g. silica gel. The product is collected using v./v. 1:3 to 1:1 ether-petroleum ether. The combined material is crystallized from ether, M.P. 62–64°.

EXAMPLE 18

*Methyl-(1-p-chlorobenzoyl-2-methyl-5-nitro-3-indolyl) acetate*

In a dried 250 ml. flask is placed 3.9 g. of methyl-(2-methyl-5-nitro-3-indolyl) acetate in 125 ml. dry dimethylformamide. To this solution cooled to 0° C. is added 0.8 g. of 50% sodium hydride-mineral oil. This is stirred under nitrogen for 30 minutes. To this is added dropwise 2.75 g. of p-chlorobenzoyl chloride in 15 ml. of dry dimethylformamide over a 5-minute period. The reaction mixture is stirred 4 hours at 0° C. under nitrogen and then stirred overnight at room temperature under nitrogen. It is then poured into an ice water-benzene solution containing a few milliliters of acetic acid. The benzene layer is separated and the aqueous layer is washed with benzene. The combined benzene layers are washed with sodium bicarbonate followed by water, dried over anhydrous sodium sulfate and concentrated to dryness in vacuo. The product is crystallized from benzene-Skellysolve B, M.P. 170–171°. *Microanalysis.*—Calc. C, 59.00; H, 3.91; N, 7.24. Found: C, 59.24; H, 4.00; N, 7.39.

The corresponding propionate is formed when an equivalent amount of the corresponding methyl-α-(2-methyl-5-nitro-3-indolyl) propionate prepared in Example 13 is used as the starting material.

EXAMPLE 19

*Methyl-(1-p-chlorobenzoyl-2-methyl-5-dimethylamino-3-indolyl) acetate*

To a solution of 0.387 g. of methyl-α-(1-p-chlorobenzoyl-2-methyl-5-nitro-3-indolyl) acetate in 20 ml. of distilled dimethoxyethane is added 1.5 ml. of glacial acetic acid and 0.5 ml. of a 37% solution of aqueous formaldehyde. This mixture is reduced with Raney nickel at 40 p.s.i. and room temperature. After the theoretical amount of hydrogen has reacted, the reaction mixture is filtered, concentrated in vacuo to a small volume and diluted with ether. The ether solution is washed with sodium bicarbonate, then with water, dried with anhydrous sodium sulfate and concentrated in vacuo to an oil. *Microanalysis.*—Calc. C, 65.50; H, 5.50; N, 7.28. Found: C, 65.66; H, 5.91; N, 7.46.

EXAMPLE 20

*Methyl-(1-p-chlorobenzoyl-2-methyl-5-acetamino-3-indolyl) acetate*

To 0.38 g. of methyl-(1-p-chlorobenzoyl-2-methyl-5-nitro-3-indolyl) acetate in 30 ml. of anhydrous ethyl acetate is added 0.306 g. acetic anhydride. The mixture is reduced with Raney nickel at room temperature and 40 p.s.i. After the theoretical amount of hydrogen has been absorbed, the catalyst is removed by filtration. The solution is concentrated in vacuo to a small volume and poured into an ice water-ether mixture. The ether layer is separated and the aqueous layer is washed with ether. The combined ether extracts are washed with sodium bicarbonate followed by water, dried with anhydrous sodium sulfate and concentrated in vacuo to dryness. The product is crystallized from benzene and ether, M.P. 176–177° C. *Microanalysis.*—Calc. C, 63.25; H, 4.80; N, 7.02. Found: C, 63.40; H, 4.82; N, 6.89.

EXAMPLE 21

Benzyl-(2-methyl-5-nitro-3-indolyl) acetate

In a dry 250 ml. flask is placed 80 ml. dry benzene and 20 ml. benzyl alcohol. To this is added 3.0 g. of 2-methyl-5-nitro-3-indolyl acetic acid and 0.2 g. of p-toluenesulfonic acid. This slurry (which clears on heating) is heated to reflux under nitrogen. The water formed during the reaction is collected in a Stark and Dean tube. The reaction is stopped when the distillate is clear (about 2 hours). The excess benzyl alcohol is removed in vacuo. The residue is dissolved in benzene and washed with sodium bicarbonate followed by water, dried over anhydrous magnesium sulfate and concentrated in vacuo. The product is absorbed on 15 g. of acid washed alumina and chromatographed over 75 g. of acid washed alumina. The product is eluted with v./v. 1:1–3:1 ether-benzene. The eluate is evaporated and the combined product is crystallized from benzene-Skellysolve B, M.P. 147–148°. *Microanalysis.*—Calc. C, 66.66; H, 4.97; N, 8.64. Found: C, 66.83; H, 4.77; N, 8.52.

EXAMPLE 22

Benzyl-(1-p-chlorobenzoyl-2-methyl-5-nitro-3-indolyl) acetate

In a dry 125 ml. flask is placed 3.0 g. of benzyl-(2-methyl-5-nitro-3-indolyl) acetate in 60 ml. of dry dimethylformamide. To this solution, cooled to 0° C. in a nitrogen atmosphere is added 0.475 g. of 50% sodium hydride-mineral oil. This is stirred for 30 minutes. Then 1.65 g. of p-chlorobenzoyl in 10 ml. of dry dimethylformamide is added dropwise over a 5-minute period. The reaction mixture is stirred at 0° C. for 4 hours under a nitrogen atmosphere followed by stirring at room temperature under nitrogen overnight. It is then poured into an ice water-benzene mixture. The benzene layer is separated and the aqueous layer is washed with benzene. The combined benzene extracts are washed with sodium bicarbonate followed by water, dried with anhydrous sodium sulfate and concentrated in vacuo to dryness. The product is crystallized from benzene-Skellysolve B, M.P. 166–167° C. *Microanalysis.*—Calc. C, 64.86; H, 4.14; N, 6.05. Found: C, 64.78; H, 4.22; N, 5.91.

EXAMPLE 23

Methyl-α-(1-p-chlorobenzoyl-2-methyl-5-amino-3-indolyl)-propionate 0.025 M of methyl-α-(1-p-chlorobenzoyl-2-methyl-5-nitro-3-indolyl)-propionate in 100 ml. of ethanol is hydrogenated in the presence of 120 mg. of 10% palladium or charcoal catalyst at 40 p.s.i. at room temperature. After 0.075 M of hydrogen has been consumed, the hydrogenation is stopped, and the solution filtered to remove the catalyst. The filtrate is concentrated to dryness in vacuo to give methyl-α-(1-p-chlorobenzoyl-2-methyl-5-amino-3-indolyl)-propionate.

EXAMPLE 24

Methyl-α-[1-chlorobenzoyl-2-methyl-5-(N-methylacetamido)-3-indolyl] acetate

Methyl-1-p-chlorobenzoyl - 2 - methyl - 5-acetamido-3-indolyl-acetate is added to a suspension of sodium hydried in dimethylformamide with stirring and ice-cooling. After one hour methyl iodide is added and the mixture is stirred overnight. The reaction mixture is poured into iced-water and extracted with ether. Evaporation of the ethereal solution and chromatography of the residual oil on an alumina column, using 15–25% (v./v.) ether in petroleum ether as the eluent, gives methyl 1-p-chlorobenzoyl - 2-methyl - 5 - (N-methyl acetamido)-3-indolyl acetate.

EXAMPLE 25

A. *Methyl-[1-p-chlorobenzoyl - 2 - methyl-5-bis(β-hydroxyethyl)amino-3-indolyl] acetate.*—A mixture of 0.02 mole of methyl α-(1-p-chlorobenzoyl-2-methyl-5-amino-3-indolyl)-propionate, 0.044 mole of ethylene oxide and 0.03 mole of acetic acid in 300 ml. dimethoxyethane is heated to 100° for 18 hours in an autoclave. The mixture is then diluted with water and filtered to yield crude methyl-[1-p-chlorobenzoyl - 2 - methyl - 5 - bis(β-hydroxyethyl)amino-3-indolyl]-propionate.

B. *Methyl-[1-p-chlorobenzoyl - 2-methyl-5-(4'-methyl-1'-piperazinyl)-3-indolyl] acetate.*—The product of A is stirred at 0° in pyridine with two mole proportions of p-toluenesulfonyl chloride until the reaction is substantially complete. The mixture is poured into water and the 5-bis(p-toluenesulfonyloxyethyl)amino compound is isolated. This is dissolved in benzene and one mole proportion of methylamine is added. The mixture is allowed to stand at room temperature for 3 days. The mixture is poured into iced water containing two equivalents of sodium carbonate and extracted with ether immediately. Evaporation of the ether yields methyl-[1-p-chlorobenzoyl-2-methyl-5-(4'-methyl - 1' - piperazinyl)-3-indolyl] acetate.

Either of the above products, when used in the procedure of Example 7, gives the corresponding free acid.

EXAMPLE 26

Methyl-[1-p-chlorobenzoyl-2-methyl-5-(4'-morpholinyl)-3-indolyl] acetate

A solution of tosyl chloride (0.1 mole) in 200 ml. benzene is added dropwise with stirring to a solution of methyl-α-[1-p-chlorobenzoyl-2-methyl-5-bis(β - hydroxyethyl)amino-3-indolyl] acetate (0.1 mole) and pyridine (0.3 mole) in 300 ml. benzene at room temperature over a period of one hour. The mixture is then heated under reflux for 3 hours, washed with water, dried over sodium sulfate and evaporated to a syrup. Chromatography of the syrup on an alumina column using 30–50% (v./v.) ether in petroleum ether as the eluent gives methyl-[1-p-chlorobenzoyl-2-methyl-5-(4'-morpholinyl) - 3 - indolyl] acetate.

The above product, when used in the procedure of Example 7, gives the corresponding free acid.

EXAMPLE 27

A. *2-methyl-5-cyano-3-indolyl acetic acid methyl ester.*—A solution of p-cyano phenylhydrazine (0.1 mole) and levulinic acid (0.1 mole) in 200 ml. concentrated hydrochloric acid is heated at 90° for 20 minutes and diluted with iced water (400 ml.). The crude product which separates is extracted with ether and chromatographed on a silica gel column to give 2-methyl-5-cyano-3-indolyl acetic acid using 20–50% (v./v.) ether and petroleum ether as the eluent.

The methyl ester is prepared by treatment with diazomethane in ether until the yellow color of diazomethane persists and the mixture is evaporated.

B. *Methyl-α-(1-p-chlorobenzyoyl-2-methyl - 5 - cyano-3-indolyl) acetate.*—Alkylation of the ester (prepared in Example 26A above) in dimethylformamide with sodium hydride and p-chlorobenzoyl chloride, by the procedure of Example 2, gives methyl-(1-p-chlorobenzoyl-2-methyl-5-cyano-3-indolyl) acetate.

C. *Methyl α-(1-p-chlorobenzoyl-2-methyl - 5 - aminomethyl-3-indolyl) acetate.*—The 5-cyano ester prepared in Example 27B is hydrogenated in ethanol in the presence of Raney nickel and 3 moles of anhydrous ammonia at 2000 p.s.i. at room temperature to give, after filtration of the catalyst and evaporation of the reaction mixture, methyl (1 - p-chlorobenzoyl-2-methyl-5-aminomethyl-3-indolyl) acetate which can be recrystallized from aqueous ethanol.

D. *Methyl-(1-p-chlorobenzoyl-2-methyl - 5 - dimethylaminomethyl-3-indolyl) acetate.*—Treatment of the above α-aminomethyl indole with 2 moles of methyl iodide gives the 5-dimethylaminomethyl derivative.

E. When the products of Examples 27C and 27D above are used in the procedure of Example 7, the corresponding free acids are obtained.

EXAMPLE 28

α-(1-p-methylmercaptobenzoyl-2-methyl-5-methoxy-3-indolyl)-butyric acid

When the procedure of Examples 1 and 2 are followed using ethyl α-ethyl levulinate in place of ethyl α-methyl levulinate, there is obtained successively ethyl α-(2-methyl-5-methoxy-3-indolyl)-butyrate and ethyl α-(1-p-methylmercaptobenzoyl - 2 - methyl - 5 - methoxy-3-indolyl)-butyrate. When the latter product is used in the procedure of Example 7 the corresponding butyric acid derivative is obtained.

The starting ethyl α-ethyl levulinate is prepared by alkylation of the sodio derivative of ethyl acetoacetate in ethanol with 1 m. of ethyl α-bromobutyrate, followed by hydrolysis and decarboxylation. The α-ethyl levulinic acid obtained is reesterified with 2 N ethanolic hydrogen chloride at reflux temperature for 18 hours.

EXAMPLE 29

Methyl-1-(p-chlorobenzoyl)-2-phenyl-5-methoxy-3-indolylacetate

A mixture of 0.145 mole of anhydrous sodium acetate and 0.183 mole of p-methoxyphenylhydrazine hydrochloride in 150 ml. of methanol is stirred under nitrogen for one-half hour. 3-benzoylpropionic acid (0.142 mole) in 80 ml. of methanol is added and the mixture is stirred for one hour. Anhydrous hydrogen chloride (0.50 mole) in 125 ml. of methanol is added over 20 minutes. The mixture is heated 2 hours on a steam bath, cooled and concentrated in vacuo. The residue is taken up in 500 ml. of benzene, washed with 150 ml. of 2.5 N HCl, followed by 150 ml. of saturated aqueous NaHCO₃, and finally water and then dried over Na₂SO₄. Evaporation of the benzene solution and chromatography of the crude product on 200 g. of acid-washed alumina, using ether-petroleum ether (20–50% ether by volume) as the eluent gives methyl-2-phenyl-5-methoxy-3-indolyl acetate, M.P. 120–120.5°.

The above ester is used in the procedure of Example 3 in place of the corresponding 2-methyl indole, to yield methyl-1-p-chlorobenzoyl-2-phenyl-5-methoxy - 3 - indolyl acetate.

When 3-p-fluorobenzoylpropionic acid, 3-m-trifluoromethylbenzoylpropionic acid and 3-p-methoxybenzoylpropionic acid is used in the above procedure, the correspondingly substituted 2-phenyl-3-indolyl acid esters are obtained.

EXAMPLE 30

Ethyl-α-(1-benzoyl-2-methyl-5-methoxy-3-indolyl) acrylate

A. 500 ml. of dry ether, 36.02 g. of triphenylphosphonium bromide and 94.36 ml. of 1.10 N n-butyl lithium are stirred for 1 hour at room temperature under nitrogen. 38 g. of ethyl (2-methyl-5-methoxy-3-indolyl) glyoxylate in 260 ml. of benzene and 500 ml. of dry ether are added, and stirring continued for 1 hour. The reaction mixture is transferred to a pressure flask and heated in a closed flask at 65–70° C. for 5 hours. The liquid is poured from the pressure flask and the gum triturated with 500 ml. of 33% benzene in ether. The solutions are combined and washed with three 500 ml. portions of water, dried over sodium sulfate, filtered and concentrated in vauco to a syrup. The syrup is slurried in benzene and charged onto a 200 g. column of activated alumina. Ethyl α - (2 - methyl-5-methoxy-3-indolyl)-acrylate is eluted by washing the column with 30% ether in petroleum ether and removing the eluting solvents by evaporation.

The procedure of Example 13B is then followed using a p-nitrophenyl benzoate in equivalent quantities in place of the p-nitrophenyl isonicotinate, to give ethyl-α-(1-benzoyl-2-methyl-5-methoxy-3-indolyl)-acrylate.

EXAMPLE 31

Ethyl-α-(1-benzoyl-2-methyl-5-methoxy-3-indolyl) cyclopropyl carboxylate 1.8 g. of ethyl α-(1-benzoyl-2-methyl-5-methoxy-3-indolyl)-acrylate in 10 ml. of dry tetrahydrofuran is added to 4 g. of diiodomethane, 1.25 g. of zinc-copper couple and 0.2 g. of iodine in 20 ml. of dry tetrahydrofuran. The mixture is refluxed under nitrogen with stirring for 20 hours. The reaction mixture is then filtered, the filtrate added to ice water, and the whole extracted with three 50-ml. portions of ether. The combined ether extracts are washed with two 50-ml. portions of water, dried over sodium sulfate, filtered and concentrated. The syrup thus obtained is poured onto a 60 g. alumina column as a slurry in benzene. Ethyl α-(1-benzoyl-2-methyl-5-methoxy-3-indolyl)-cyclopropylcarboxylate is collected from the column by elution with 60% ether-petroleum ether.

EXAMPLE 32

The corresponding N-1 aroyl or heteroaroyl derivatives of benzyl - α - (2-methyl-5-methoxy-3-indolyl)propionate, benzyl-(2-methyl-5-methoxy-3-indolyl)acetate and benzyl-(2-methyl-5-nitro-3-indolyl)acetate are obtained by reacting these esters by the procedure of Example 13B with the p-nitrophenyl esters of the following acids, the p-nitrophenyl esters having been obtained from the acids by the procedure of Example 13A, using in each case the equivalent amount of the selected acid in place of the isonicotinic acid used in 13A and of its nitrophenyl ester used in 13B and equivalent quantities of the indolyl esters:

1-methylpyrryl-2-carboxylic acid,
5-methylpyrazole-3-carboxylic acid,
1,5-dimethyl-4-bromopyrazole-3-carboxylic acid,
1-phenylpyrazole-4-carboxylic acid,
1-phenyl-5-pyrazolone-3-carboxylic acid,
2-phenyl-5-methyloxazole-4-carboxylic acid,
isoxazole-3-carboxylic acid,
5-phenylisoxazole-3-carboxylic acid,
1,2-benzoisothiazole-3-carboxylic acid,
1,2,3-thiadiazole-4-carboxylic acid,
1-methyl-1,2,3,-triazole-4-carboxylic acid,
nicotinic acid,
picolinic acid,
isonicotinic acid-N-oxide,
3-chloroisonicotinic acid,
6-methoxynicotinic acid,
6-phenylnicotinic acid,
α-pyrone-5-carboxylic acid,
pyridazine-4-carboxylic acid,
3-keto-4-methyl-2-phenyl-2,3-dihydropyridazine-6-carboxylic acid,
cinnoline-4-carboxylic acid,
2-methylmercapto-4-chloropyrimidine-5-carboxylic acid
2,4-dichloropyrimidine-5-carboxylic acid,
pyrazinoic acid,
5-methoxypyrazinoic acid,
p-difluoromethoxy benzoic acid (prepared by the action of difluorochloromethane on the p-hydroxybenzoate of benzyl alcohol followed by hydrogenation of the benzyl group). The esters so obtained are converted to the free acids by the procedure of Example 7C.

EXAMPLE 33

Ethyl-α-(1-p-chlorobenzoyl-2-methyl-5-ethoxy-3-indolyl) propionate

The procedure of Example 1A is followed using an equivalent quantity of p-ethoxyphenylhydrazine hydrochloride in place of the methoxyphenylhydrazine to give ethyl-α-(2-methyl-5-ethoxy-3-indolyl) propionate. When this is used in the procedure of Example 3 there is obtained ethyl-α-(1-p-chloro-benzoyl-2-methyl-5-methoxy-3-indolyl) propionate. This product, when used in the procedure of Example 7, yields the corresponding free α-indolyl propionic acid.

Similarly when p-propoxy and p-butoxy phenylhydrazines are used in the above procedures, the correspondingly 5 substituted indolyl acids are obtained.

When the procedure of Example 1A is followed using in place of the p-methoxyphenylhydrazine, equivalent amounts of p-ethylphenylhydrazine, p-butylphenylhydrazine, p-methyl-m-fluorophenylhydrazine, p-fluorophenylhydrazine, and p-fluoro-m-methoxyphenylhydrazine (each obtainable by diazotization of the corresponding p-substituted aniline and reduction of the diazo) and the resultant indolyl ester is acylated by the procedure of Example 3 and further treated by the procedure of Example 7, the corresponding 5-substituted indolyl esters and acids are obtained.

When the procedure of Examples 1A, 3 and 7 are followed starting with phenylhydrazine, the corresponding 5-unsubstituted indolyl esters and acid are produced.

EXAMPLE 34

1-benzoyl-2-methyl-5-methoxy-3-indolylacetamide

To a suspension of 1.0 g. of 50% sodium hydride in 80 ml. benzene is added 4.4 g. of 2-methyl-5-methoxy-3-indolylacetamide with stirring. Twenty ml. of dimethylformamide is then added, followed by 2.8 g. benzoyl chloride twenty minutes later. The reaction mixture is stirred at room temperature for 1 hour and then poured into 400 ml. of ice and water. The precipitate is collected on a filter, M.P. 215–218°. The crude product is recrystallized from ethyl acetate twice, M.P. 219–220°. Its ultraviolet absorption spectrum in ethanol shows maxima at λ max. 2675 A., E 1% 406 and λ max. 3160 A., E 1% 188. Characteristic of a N-benzoyl indole chromophore. *Microanalysis.*—Calculated for $C_{19}H_{16}N_2O_3$: C, 71.24; H, 5.03. Found: C, 71.00; H, 5.35.

EXAMPLE 35

1-benzoyl-2-methyl-5-methoxy-3-indolyl-acetic acid

To a solution of 3.2 g. of 1-benzoyl-2-methyl-5-methoxy-3-indolylacetamide in 50 ml. dimethoxyethane containing 1 ml. of 12 N hydrochloric acid at 0° is added 0.7 g. of sodium nitrite with stirring. After gas evolution has subsided the mixture is poured into 200 ml. of iced water and the precipitate is extracted with methylene chloride. The methylene chloride solution is extracted with sodium bicarbonate solution. Acidification of the aqueous solution with 2 N hydrochloric acid precipitates the desired acid which is purified by recrystallization from benzene and from ethyl acetate-Skellysolve B.

EXAMPLE 36

The acrylation procedures of Example 3 or of Example 12A are followed using various aromatic acyl chloride in equivalent quantities in place of p-chlorobenzoyl chloride and using, as necessary, esters of 2-methyl-5-methoxy-3-indolyl acetic acid or of α-(2-methyl-5-methoxy-3-indolyl)propionic acid. Some of the resulting esters are converted to the corresponding free acid by the method of Example 7 or of 12B as indicated below. Where the method of Example 12B is used, the 1-acylation is by the process of Example 12A. The products obtained by these experiments are:

(1 - p - methoxybenzoyl - 2-methyl-5-methoxy-3-indolyl)-acetic acid, M.P. 88–89° C. (free acid by method of Example 7), α - (1 - p-methoxybenzoyl-2-methyl-5-methoxy-3-indolyl)-propionic acid, M.P. 65° C. (free acid by method of Example 7), methyl - (1 - p-bromobenzoyl-2-methyl-5-methoxy-3-indolyl) acetate, M.P. 106–107.5° C., methyl - (1 - p - nitrobenzoyl-2-methyl-5-methoxy-3-indolyl) acetate, M.P. 130–132° C., methyl - (1 - o-chlorobenzoyl-2-methyl-5-methoxy-3-indolyl) acetate, M.P. 91–93° C., methyl - (1 - m-chlorobenzoyl-2-methyl-5-methoxy-3-indolyl) acetate, M.P. 51–52° C., methyl - (1 -p-phenylbenzoyl-2-methyl-5-methoxy-3-indolyl) acetate, M.P. 101.5–103° C., methyl - (1-p-acetoxybenzoyl-2-methyl-5-methoxy-3-indolyl) acetate, M.P. 99–101° C., ethyl - [1 - (4 - thiazolylcarboxy)-2-methyl-5-methoxy-3-indolyl) acetate, M.P. 76–82° C., ethyl - [1 - (2 - thenoyl)-2-methyl-5-methoxy-3-indolyl)-acetate (oil), t - butyl - α - (1 - p-bromobenzoyl-2-methyl-5-methoxy-3-indolyl)propionate, M.P. 103–105° C., methyl - (1 - α-naphthoyl-2-methyl-5-methoxy-3-indolyl)-acetate (oil), methyl - (1 - p - benzyloxybenzoyl-2-methyl-5-methoxy-3-indolyl)acetate, M.P. 116–118° C., methyl - (1 - p - hydroxybenzoyl - 2-methyl-5-methoxy-3-indolyl)acetate M.P. 155–158° C. (prepared from the p-benzyloxybenzoyl compound by catalytic hydrogenation over palladium), methyl - (1 - o - benzyloxybenzoyl-2-methyl-5-methoxy-3-indolyl)acetate (not isolated—used to prepare next compound by catalytic hydrogenation over palladium), methyl - (1 - o - hydroxybenzoyl-2-methyl-5-methoxy-3-indolyl)acetate (oil), methyl - (1 - o-fluorobenzoyl-2-methyl-5-methoxy-3-indolyl)acetate, M.P. 98–99° C.,

[1 - (2 - thenoyl) - 2 - methyl-5-methoxy-3-indolyl] acetic acid, M.P. 62° (method of Example 12), methyl - (1 - β-naphthoyl-2-methyl-5-methoxy-3-indolyl)-acetate, M.P. 120–124° C., methyl - [1 - (5 - chloro-2-thenoyl)-2-methyl-5-methoxy-3-indolyl] acetate (oil), (1 - p - trifluoromethylbenzoyl-2-methyl-5-indolyl)acetic acid, M.P. 169–171° C. (method of Example 12), methyl - [1-(2,6-dimethoxybenzoyl)-2-methyl-5-methoxy-3-indolyl] acetate, M.P. 139.5–141° C., methyl - [1 - (o,p-dichlorobenzoyl-2-methyl-5-methoxy-3-indolyl) acetate (oil).

EXAMPLE 37

The procedure of Example 1A is followed using an equivalent quantity of each of the following phenylhydrazines in place of the p-methoxyphenyl hydrazines: p-dimethylsulfonamidophenylhydrazine, p - benzylmercaptophenylhydrazine, p-vinylphenylhydrazine.

When the resulting indolyl acid is acylated by the procedure of Example 3, the coresponding 1-chlorobenzoyl indolyl acids are obtained.

EXAMPLE 38

1-p-chlorobenzoyl-2-benzyl-3-indolylacetic acid

The method of Stoll et al. [Helv. Chim. Acta 38, 1452 (1955)], is used with 2-benzylindole to obtain 2-benzyl-3-indolylacetic acid. To a solution of 0.1 mole of this acid in 200 ml. of tetrahydrofuran is added 0.049 mole of dicyclohexylcarbodiimide. The mixture is allowed to stand at room temperature for 2 hours, after which the precipitated urea is removed by filtration and the filtrate is evaporated in vacuo. The residue (crude anhydride of the acid) is flushed with petroleum ether and used as is in the next step.

t-Butyl alcohol (25 ml.) and fused zinc chloride (3 g.) are added to the crude anhydride and the excess alcohol is removed in vacuo after the mixture is refluxed 16 hours. The residue is dissolved in ether, washed with saturated brine and dried over $MgSO_4$. The solution is treated with charcoal and evaporated and the residue is flushed with petroleum ether to remove completely the alcohol. The residual t-butyl ester is used without purification.

A solution of 20.9 g. of the above ester in 450 ml. dry tetrahydrofuran is cooled to 4° and 4.9 g. of sodium hydride is added, as a 50% suspension in mineral oil, in small portions. After 15 minutes, 15 g. of p-chlorobenzoylchloride is added dropwise over 10 minutes. The mixture is stirred 9 hours while allowing it to warm to ambient temperature. It is then poured into 1 liter of 5% acetic acid and extracted with an ether benzene mixture (1:1). The extract is washed with water, NaHCO₃ aqueous and saturated brine and dried over MgSO₄. The solution is then treated with charcoal, filtered and evaporated. The residue is slurried in ether, filtered and evaporated. The crude product obtained as a residue is chromatographed on 600 g. of acid washed alumina, using a mixture of ether-petroleum ether (10 to 50% ether by volume) as the eluent.

A mixture of 10 parts of the t-butyl 1-p-chlorobenzyl-2-benzyl-3-indolylacetate thus prepared and 1 part of porous plate is heated to 210° C. by an external oil bath under nitrogen for 2 hours. The mixture is cooled under nitrogen and the product is dissolved in benzene and ether (1:1). The solution is extracted with aqueous sodium bicarbonate. The extract is subjected to reduced pressure to remove ether and then acidified weakly with dilute HCl. The crude 1-p-chlorobenzoyl-2-benzyl-3-indole acetic acid is recrystallized from aqueous ethanol and dried in vacuo.

EXAMPLE 39

*1-p-chlorobenzoyl-2-methyl-5-methoxy-3-indolylacetmorpholide*

Isobutylchloroformate (0.0077 mole) is added to an ice-cooled nitrogen blanketed solution of 1-p-chlorobenzoyl-2-methyl-5-methoxy-3-indolyl acetic acid (0.0075 mole) and triethylamine (0.0075 mole) in 40 ml. of anhydrous 1,2-dimethoxyethane. After stirring in the cold for 20 minutes, the mixture is filtered, and the filtrate immediately ice-cooled and placed in a nitrogen atmosphere again.

Morpholine (0.008 mole) in 10 cc. 1,2-dimethoxyethane is then added, and the mixture is allowed to stir, cold, overnight. The mixture is then filtered and the product rinsed with a small amount of solvent. One recrystallization from benzene-petroleum ether gives 1-p-chlorobenzoyl - 2 - methyl - 5-methoxy-3-indolylacetmorpholide, M.P. 162–163.5° C.

EXAMPLE 40

The use of equivalent amounts of anhydrous dimethylamine, ethanolamine, benzylamine, N,N-diethyl-ethylenediamine and benzyl glycinate in place of morpholine in Example 39 gives N,N-dimethyl-1-p-chlorobenzoyl-2-methyl - 5 - methoxy-3-indolylacetamide, M.P. 179.5–180.5° C.; N-β-hydroxyethyl-1-p-chlorobenzoyl-2-methyl-5-methoxy-3-indolylacetamide, M.P. 137–138° C.; N - benzyl - 1-p-chlorobenzoyl-2-methyl-5-methoxy-3-indolylacetamide; N-β-N',N'-diethylaminoethyl-1-p-chlorobenzoyl - 2 - methyl-5-methoxy-3-indolylacetamide, M.P. 110–111.5°; and N-carbobenzyloxymethyl-1-p-chlorobenzoyl-2-methyl-5-methoxy-3-indolylacetamide, M.P. 133–134.5° C. respectively.

EXAMPLE 41

*N-carboxymethyl-1-p-chlorobenzoyl-2-methyl-5-methoxy-3-indolylacetamide*

N - carbobenzyloxymethyl - 1 - p - chlorobenzoyl - 2-methyl-5-methoxy-3-indolylacetamide (0.003 mole) in 25 ml. of anhydrous methanol is reduced in the presence of 1 g. 5% palladium on carbon at room temperature under a hydrogen pressure of 40 p.s.i. The mixture is filtered and the methanol removed in vacuo to give an oil which solidifies on trituration with benzene. Recrystallization from a benzene-methanol-petroleum ether system gives N - carboxymethyl - 1 - p - chlorobenzoyl - 2 methyl - 5-methoxy-3-indolylacetamide, M.P. 152.5–154° C.

EXAMPLE 42

The procedure of Example 39 is followed using, in place of morpholine, an equivalent quantity of piperidine, pyrrolidine, N-methyl piperazine, N-phenylpiperazine, N-hydroxyethyl piperazine, piperazine, diethylamine, diethanolamine, aniline, p-ethoxyaniline, p-chloraniline, p-fluoroaniline, p-trifluoromethylaniline, butylamine, cyclohexylamine, methylamine, D-glucosamine, tetra-o-acetyl-D-glucosamine, 1,3,4,6-tetraacetyl-o-methyl-D-glucosamine, D-glucosylamine, D-galactosylamine, D-mannosylamine, N,N-dimethylglycine amide, N,N-dibutylglycine amide, N-methyl-2-aminomethylpiperidine, N-methyl-2-aminomethylpyrrolidine, N-methyl-3-aminopiperidine, N-methyl-3-aminopyrrolidine, β-ethoxyethylamine, ethanolamine, di(β-ethoxyethyl)amine, benzylamine, β-phenethylamine, α-phenethylamine, dibenzylamine and D-mannosamine. The products obtained are the corresponding amides of 1-p-chlorobenzoyl-2-methyl-5-methoxy-3-indolyl acetic acid.

Similarly, when 1-p-chlorobenzoyl-2-methyl-5-fluoro-3-indolylacetic acid is used in place of the 5-methoxy compound in the above procedure, the corresponding amides of the above amine (e.g., 1-p-chlorobenzoyl-2-methyl - 5 - fluoro-3-indolylacetmorpholide, M.P. 168–170°) are obtained.

EXAMPLE 43

The procedure of Example 39 is followed using, in place of the 1-p-chlorobenzoyl-2-methyl-5-methoxy-3-indolylacetic acid used therein, an equivalent quantity of each of the α-1-acyl-3-indolyl acids described in Examples 1 through 37, to produce the corresponding morpholides. Similarly, when in the above the other amines used in Examples 39 and 41 are used, the corresponding amides of each of these acids is obtained.

I claim:

1. α - (1 - p - chlorobenzoyl - 2 - methyl - 5 - methoxy-3-indolyl)acetmorpholide.
2. α - (1 - p - chlorobenzoyl - 2 - methyl - 5 - methoxy-3-indolyl)acetdiethylamide.
3. α - (1 - p - chlorobenzoyl - 2 - methyl - 5 - methoxy-3-indolyl)acet-β-hydroxyethylamide.
4. α - (1 - p - chlorobenzoyl - 2 - methyl - 5 - methoxy-3-indolyl)acetglucosamide.
5. α - (1 - p - chlorobenzoyl - 2 - methyl - 5 - methoxy-3-indolyl)acet-β-dimethylaminoethylamide.
6. α - (1 - p - chlorobenzoyl - 2 - methyl - 5 - methoxy-3-indolyl)acet-β-diethylaminoethylamide.
7. α - (1 - p - chlorobenzoyl - 2 methyl - 5 - methoxy-3-indolyl)propiomorpholide.
8. α - (1 - p - chlorobenzoyl - 2 methyl - 5 - fluoro - 3-indolyl)acetmorpholide.
9. A compound of the structure,

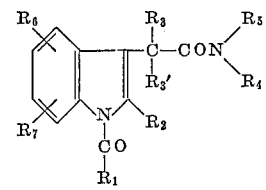

wherein

R₁ is selected from the group consisting of phenyl, naphthyl, biphenyl and Het wherein Het is furyl, thienyl, pyrryl, thiazolyl, thiadiazolyl, pyrazinyl, pyridyl, pyrazolyl, imidazolyl, oxazolyl, pyrimidinyl, isoxazolyl, oximidazolyl, benzimidazolyl, indazolyl, benzoxazolyl, pyrazolonyl, isothiazolyl, triazolyl and pyridazinyl; and substituted phenyl, naphthyl, biphenyl and Het wherein said substituent is selected from the group consisting of hydroxy, lower alkoxy, phenoxy, nitro, halogen, lower dialkylamino, mercapto, lower alkylthio, benzylthio, lower alkanoyl; N,N-dimethylsulfamyl, carb-lower alkoxy, methyl, trifluoromethylacetyl phenyl, cyano, N,N-dimethylcarbamoyl, trifluoromethylthio, methylsulfonyl, N,N-dimethylsulfonamido, acetamino and difluoromethoxy;

$R_2$ is selected from the group consisting of hydrogen, lower alkyl, lower alkenyl and phenyl;

$R_3$ is selected from the group consisting of hydrogen, lower alkyl, lower alkenyl, benzyl and together with $R_3'$ and the carbon atom to which it is attached forms the cyclopropyl ring;

$R_3'$ is selected from the group consisting of hydrogen, and together with $R_3$ and the carbon atom to which it is attached forms the cyclopropyl ring; and $R_4$ and $R_5$ are selected from the group consisting of lower alkyl, hydroxy lower alkyl, benzyl, diethylaminoethyl, phenyl, ethoxyphenyl, chlorophenyl, fluorophenyl, trifluoromethylphenyl, cyclohexyl, N,N-dimethylcarbamylmethyl, N,N-dibutylcarbamylmethyl, (N-methyl-piperidyl-2) methyl, (N-methylpyrrolidyl-2) methyl, N-methyl-piperidyl, N-methylpyrrolidyl, ethoxyethyl, phenethyl, polyhydroxy lower alkyl and hydrogen, only one of said $R_4$ and $R_5$ being hydrogen at any one time, together with the nitrogen and amino sugar, and when $R_4$ and $R_5$ are taken together with the nitrogen is selected from the group consisting of morpholino, piperidino, pyrrolidino, N-methylpiperazino, N-phenylpiperazino, N-hydroxyethylpiperazino and piperazino;

$R_6$ and $R_7$ are each selected from the group consisting of hydrogen, halogen, lower alkyl, lower alkoxy, halo lower alkyl, hydroxy lower alkyl, nitro, amino, lower alkylamino, di-lower alkylamino, cyano, aminomethyl, lower alkyl aminomethyl, di(lower alkyl) aminomethyl, mercapto, lower alkylthio, benzylthio, di(lower alkyl) sulfonamido and lower alkyl sulfonamido.

References Cited by the Examiner
UNITED STATES PATENTS

| | | | |
|---|---|---|---|
| 1,915,334 | 6/1933 | Salzberg et al. | 260—243 |
| 2,075,359 | 3/1937 | Salzberg et al. | 167—22 |
| 2,937,118 | 5/1960 | Von Haxthausen et al. | 167—65 |
| 3,063,902 | 11/1962 | Gray et al. | 167—65 |
| 3,083,204 | 3/1963 | Klavehn et al. | 260—247.2 |
| 3,100,205 | 8/1963 | Schulte et al. | 260—247.2 |

ALEX MAZEL, *Primary Examiner.*

NICHOLAS S. RIZZO, HENRY R. JILES, J. TOVAR, *Examiners.*